A1 United States Patent
Foil

(10) Patent No.: US 11,965,749 B2
(45) Date of Patent: Apr. 23, 2024

(54) SYSTEM AND METHOD FOR AUTOMATED LANE CONFLICT ESTIMATION IN AUTONOMOUS VEHICLE DRIVING AND MAP GENERATION

(71) Applicant: Argo AI, LLC, Pittsburgh, PA (US)

(72) Inventor: Greydon Taylor Foil, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 396 days.

(21) Appl. No.: 17/219,081

(22) Filed: Mar. 31, 2021

(65) Prior Publication Data

US 2022/0316907 A1 Oct. 6, 2022

(51) Int. Cl.
*G01C 21/36* (2006.01)
*B60W 60/00* (2020.01)
*G06N 20/00* (2019.01)

(52) U.S. Cl.
CPC ..... *G01C 21/3658* (2013.01); *B60W 60/0017* (2020.02); *G06N 20/00* (2019.01); *B60W 2552/53* (2020.02)

(58) Field of Classification Search
CPC .......... G01C 21/3658; B60W 60/0017; B60W 2552/53; B60W 2552/10; B60W 2555/60; B60W 2556/40; B60W 60/001; G06N 20/00
USPC .......................................................... 701/23
See application file for complete search history.

(56) References Cited

U.S. PATENT DOCUMENTS

| 10,545,029 | B2 | 1/2020 | Yang et al. | |
| 2016/0161270 | A1* | 6/2016 | Okumura | G08G 1/09675 |
| | | | | 701/23 |
| 2018/0288320 | A1 | 10/2018 | Melick et al. | |
| 2019/0137280 | A1 | 5/2019 | Ghadiok et al. | |
| 2020/0005645 | A1* | 1/2020 | Wray | B60W 30/18154 |
| 2020/0341478 | A1* | 10/2020 | Fairfield | G01C 21/3461 |
| 2021/0041883 | A1 | 2/2021 | Bansal | |
| 2021/0053570 | A1* | 2/2021 | Akella | G05D 1/0088 |

(Continued)

FOREIGN PATENT DOCUMENTS

KR   1020200025704 A   3/2020

OTHER PUBLICATIONS

Van Winden et al., "Automatic update of road attributes by mining GPS tracks," Jan. 2016.

*Primary Examiner* — Jelani A Smith
*Assistant Examiner* — George A Alcorn, III
(74) *Attorney, Agent, or Firm* — The Webb Law Firm

(57) ABSTRACT

Systems, methods, and autonomous vehicles for automated lane conflict estimation may obtain map data associated with a map of a geographic location including a roadway, determine, based on the map data, a relative lane geometry between a first lane segment and a second lane segment of a pair of overlapping lane segments; process, with a machine learning model, the relative lane geometry and a type of a traffic signal or sign associated with the pair of overlapping lane segments to generate a prediction of whether the first lane segment yields to the second lane segment for a given state of the traffic signal or sign; and use the prediction to at least one of generate a map including the lane segment associated with the prediction, facilitate at least one autonomous driving operation of an autonomous vehicle, or any combination thereof.

18 Claims, 7 Drawing Sheets

(56) References Cited

U.S. PATENT DOCUMENTS

| | | | |
|---|---|---|---|
| 2022/0001892 A1* | 1/2022 | Fairley | G06V 20/582 |
| 2022/0076036 A1* | 3/2022 | Taieb | G08G 1/0112 |
| 2022/0176949 A1* | 6/2022 | Heinzemann | B60W 30/0956 |

* cited by examiner

SYSTEM AND METHOD FOR AUTOMATED LANE CONFLICT ESTIMATION IN AUTONOMOUS VEHICLE DRIVING AND MAP GENERATION

BACKGROUND

1. Field

This disclosure relates generally to autonomous vehicle maps and, in some non-limiting embodiments or aspects, to automated lane conflict estimation.

2. Technical Considerations

In order to represent higher-level attributes of roads, an autonomous vehicle may use a vector map (e.g., a lower-resolution, vectorized map that contains lanes segmented into lane segments, etc.). Lane segments may have attributes, such as whether or not the lane segments are in a school zone, an intersection, and/or the like. For lane segments within an intersection, there may be a complicated mapping (e.g., a conflict mapping, etc.) that indicates which lane segment(s) yields to which other lane segment(s), under given traffic light and stop sign conditions.

SUMMARY

Accordingly, provided are improved systems, methods, products, apparatuses, and/or devices for lane conflict estimation in autonomous vehicle driving and map generation. Estimated lane conflicts may be used to generate and/or update a map used to control an autonomous vehicle and/or to facilitate at least one autonomous driving operation of an autonomous vehicle, such as controlling travel of the autonomous vehicle on a roadway.

According to some non-limiting embodiments or aspects, provided is a method including obtaining map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determining, based on the map data, a relative lane geometry between a first lane segment and a second lane segment of the pair of overlapping lane segments; processing, with a machine learning model, the relative lane geometry and the type of the traffic signal or sign to generate a prediction of whether the first lane segment yields to the second lane segment for a given state of the traffic signal or sign; and using the prediction to at least one of generate a map including the pair of overlapping lane segments associated with the prediction, facilitate at least one autonomous driving operation of an autonomous vehicle, or any combination thereof.

According to some non-limiting embodiments or aspects, provided is a system including one or more processors programmed and/or configured to: obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determine, based on the map data, a relative lane geometry between a first lane segment and a second lane segment of the pair of overlapping lane segments; process, with a machine learning model, the relative lane geometry and the type of the traffic signal or sign to generate a prediction of whether the first lane segment yields to the second lane segment for a given state of the traffic signal or sign; and use the prediction to at least one of generate a map including the pair of overlapping lane segments associated with the prediction, facilitate at least one autonomous driving operation of an autonomous vehicle, or any combination thereof.

According to some non-limiting embodiments or aspects, provided is an autonomous vehicle including one or more sensors and a computing device. The one or more sensors may be configured to determine sensor data associated with an environment surrounding the autonomous vehicle. The computing device may be programmed and/or configured to: obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determine, based on the sensor data and the map data, a change in the type of the traffic signal or sign; determine, based on the map data, a relative lane geometry between a first lane segment and a second lane segment of the pair of overlapping lane segments; process, with a machine learning model, the relative lane geometry and the changed type of the traffic signal or sign to generate a prediction of whether the first lane segment yields to the second lane segment for a given state of the traffic signal or sign; and control, based on the prediction, at least one autonomous driving operation of the autonomous vehicle.

Further embodiments or aspects are set forth in the following numbered clauses:

Clause 1. A computer-implemented method comprising: obtaining map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determining, based on the map data, a relative lane geometry between a first lane segment and a second lane segment of the pair of overlapping lane segments; processing, with a machine learning model, the relative lane geometry and the type of the traffic signal or sign to generate a prediction of whether the first lane segment yields to the second lane segment for a given state of the traffic signal or sign; and using the prediction to at least one of generate a map including the pair of overlapping lanes segment associated with the prediction, facilitate at least one autonomous driving operation of an autonomous vehicle, or any combination thereof.

Clause 2. The computer-implemented method of clause 1, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

Clause 3. The computer-implemented method of clauses 1 or 2, wherein each of the first lane segment and the second lane segment is associated with a start position and an end position in the map data, and wherein determining the relative lane geometry between the first lane segment and the second lane segment includes: determining a first relative angle between the start position of the first lane segment and the start position of the second lane segment; and determining a second relative angle between the start position of the first lane segment and the end position of the second lane segment.

Clause 4. The computer-implemented method of any of clauses 1-3, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

Clause 5. The computer-implemented method of any of clauses 1-4, wherein the type of the traffic signal or sign includes at least one of the following: a turning arrow signal, a non-turning arrow signal, a stop sign, or any combination thereof.

Clause 6. A system comprising: one or more processors programmed and/or configured to: obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determine, based on the map data, a relative lane geometry between a first lane segment and a second lane segment of the pair of overlapping lane segments; process, with a machine learning model, the relative lane geometry and the type of the traffic signal or sign to generate a prediction of whether the first lane segment yields to the second lane segment for a given state of the traffic signal or sign; and use the prediction to at least one of generate a map including the pair of overlapping lane segments associated with the prediction, facilitate at least one autonomous driving operation of an autonomous vehicle, or any combination thereof.

Clause 7. The system of clause 6, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

Clause 8. The system of any of clauses 6 and 7, wherein each of the first lane segment and the second lane segment is associated with a start position and an end position in the map data, and wherein the one or more processors are programmed and/or configured to determine the relative lane geometry between the first lane segment and the second lane segment by: determining a first relative angle between the start position of the first lane segment and the start position of the second lane segment; and determining a second relative angle between the start position of the first lane segment and the end position of the second lane segment.

Clause 9. The system of any of clauses 6-8, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

Clause 10. The system of any of clauses 6-9, wherein the type of the traffic signal or sign includes at least one of the following: a turning arrow signal, a non-turning arrow signal, a stop sign, or any combination thereof.

Clause 11. An autonomous vehicle comprising: one or more sensors configured to determine sensor data associated with an environment surrounding the autonomous vehicle; a computing device programmed and/or configured to: obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign; determine, based on the sensor data and the map data, a change in the type of the traffic signal or sign; determine, based on the map data, a relative lane geometry between a first lane segment and a second lane segment of the pair of overlapping lane segments; process, with a machine learning model, the relative lane geometry and the changed type of the traffic signal or sign to generate a prediction of whether the first lane segment yields to the second lane segment for a given state of the traffic signal or sign; and control, based on the prediction, at least one autonomous driving operation of the autonomous vehicle.

Clause 12. The autonomous vehicle of clause 11, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

Clause 13. The autonomous vehicle of any of clauses 11 and 12, wherein each of the first lane segment and the second lane segment is associated with a start position and an end position in the map data, and wherein the computer device is programmed and/or configured to determine the relative lane geometry between the first lane segment and the second lane segment by: determining a first relative angle between the start position of the first lane segment and the start position of the second lane segment; and determining a second relative angle between the start position of the first lane segment and the end position of the second lane segment.

Clause 14. The autonomous vehicle of any of clauses 11-13, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

Clause 15. The autonomous vehicle of any of clauses 11-14, wherein the type of the traffic signal or sign includes at least one of the following: a turning arrow signal, a non-turning arrow signal, a stop sign, or any combination thereof.

Clause 16. The autonomous vehicle of any of clauses 11-15, wherein the computing device is programmed and/or configured to control the at least one autonomous driving operation of the autonomous vehicle by controlling the vehicle to one of proceed on a route in the first lane segment and yield to another vehicle in the second lane segment.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
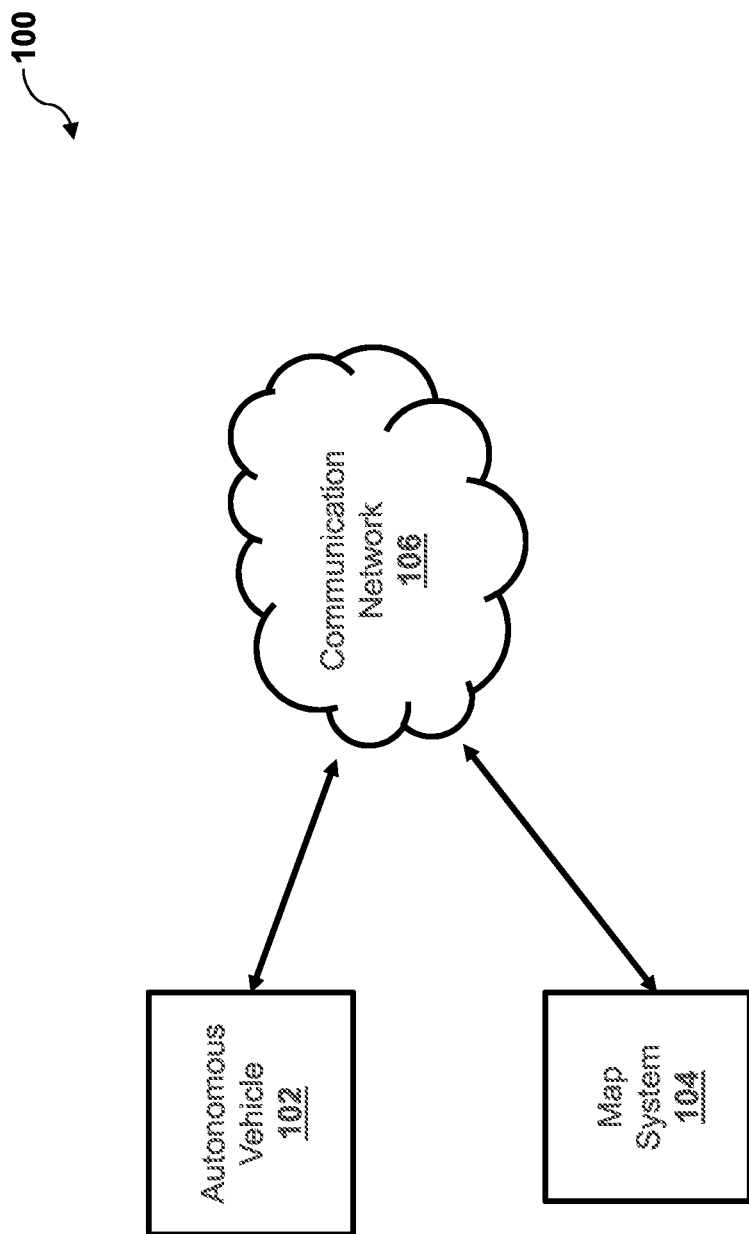
FIG. 1 is a diagram of non-limiting embodiments or aspects of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Existing conflict mapping may be an arduous process that uses a manual review to exhaustively go through a long list of lanes and lane pairs for all overlapping lanes within an intersection, for all possible traffic signal states. If two lanes overlap, a manual determination of which lane yields to which, or if there is a mutual yielding relationship between the lanes, may be determined for each possible traffic signal state. For a relatively simple four-way intersection governed by traffic lights, such a determination can result in multiple dozens of conflicts being manually determined and stored in a map in association with the overlapping lanes.

In this way, existing conflict mapping involves manually evaluating multiple conflicts and signal states in a process that is both error-prone and laborious. An incorrect selection of a conflict type may result in other vehicles being either incorrectly predicted by an autonomous vehicle to not yield to the autonomous vehicle, thereby inducing a halt or causing the autonomous vehicle to get stuck, or incorrectly presumed to have to yield to the autonomous vehicle when those other vehicles have right of way, potentially leading to unsafe behavior when the autonomous vehicle proceeds in an incorrect manner (e.g., without a right-of-way, etc.).

Non-limiting embodiments or aspects of the present disclosure provide for systems and methods that obtain map data associated with a map of a geographic location including a roadway, the roadway including a plurality of lane segments, the plurality of lane segments including a pair of lane segments that overlap each other in the roadway, the pair of lane segments being associated with a traffic signal or sign, and the map data being associated with a type of the traffic signal or sign; determine, based on the map data, a relative lane geometry between a first lane segment and a second lane segment of the pair of overlapping lane segments; process, with a machine learning model, the relative lane geometry and the type of the traffic signal or sign to generate a prediction of whether the first lane segment yields to the second lane segment for a given state of the traffic signal or sign; and use the prediction to at least one of generate a map including the lane segment associated with the prediction, facilitate at least one autonomous driving operation of an autonomous vehicle, or any combination thereof.

In this way, non-limiting embodiments or aspects of the present disclosure provide for automated conflict mapping in which maps for autonomous vehicles can be updated more quickly and with less errors, thereby enabling safer and more efficient autonomous vehicle operation.

Further, existing autonomous vehicles may have no mechanism for determining that a conflict mapping of an intersection has changed since a map used by the autonomous vehicle was generated and/or for updating the map and/or generating a new conflict mapping in real-time for the changed intersection.

Non-limiting embodiments or aspects of the present disclosure provide for autonomous vehicles that include one or more sensors configured to determine sensor data associated with an environment surrounding the autonomous vehicle; a computing device programmed and/or configured to: obtain map data associated with a map of a geographic location including a roadway, wherein the roadway includes a plurality of lane segments, wherein the plurality of lane segments include a pair of lane segments that overlap each other in the roadway, wherein the pair of lane segments is associated with a traffic signal or sign, and wherein the map data is associated with a type of the traffic signal or sign; determine, based on the sensor data and the map data, a change in the type of the traffic signal or sign; determine, based on the map data, a relative lane geometry between a first lane segment and a second lane segment of the pair of overlapping lane segments; process, with a machine learning model, the relative lane geometry and the changed type of the traffic signal or sign to generate a prediction of whether the first lane segment yields to the second lane segment for a given state of the traffic signal or sign; and control, based on the prediction, at least one autonomous driving operation of the autonomous vehicle In this way, non-limiting embodiments or aspects of the present disclosure provide for autonomous vehicles capable of determining that a conflict mapping of an intersection has changed since a map used by the autonomous vehicle was generated, determining a new or updated conflict mapping in real-time, and controlling the autonomous vehicles based on the new or updated conflict mapping that more accurately represents the intersection, thereby enabling safer and more efficient autonomous vehicle operation.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, map system 104, and/or communication network 106.

Autonomous vehicle 102 may include one or more devices capable of receiving information and/or data from map system 104 via communication network 106 and/or communicating information and/or data to map system 104 via communication network 106. For example, autonomous vehicle 102 may include a computing device, such as a server, a group of servers, and/or other like devices.

Map system 104 may include one or more devices capable of receiving information and/or data from autonomous vehicle 102 via communication network 106 and/or communicating information and/or data to autonomous vehicle 102 via communication network 106. For example, map system 104 may include a computing device, such as a server, a group of servers, and/or other like devices.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 102 may incorporate the functionality of map system 104 such that autonomous vehicle 102 can operate without communication to or from map system 104. Additionally, or alternatively, a set of devices and/or systems (e.g., one or more devices or systems) of environment 100 may perform one or more functions described as being performed by another set of devices and/or systems of environment 100.

Figure 2:
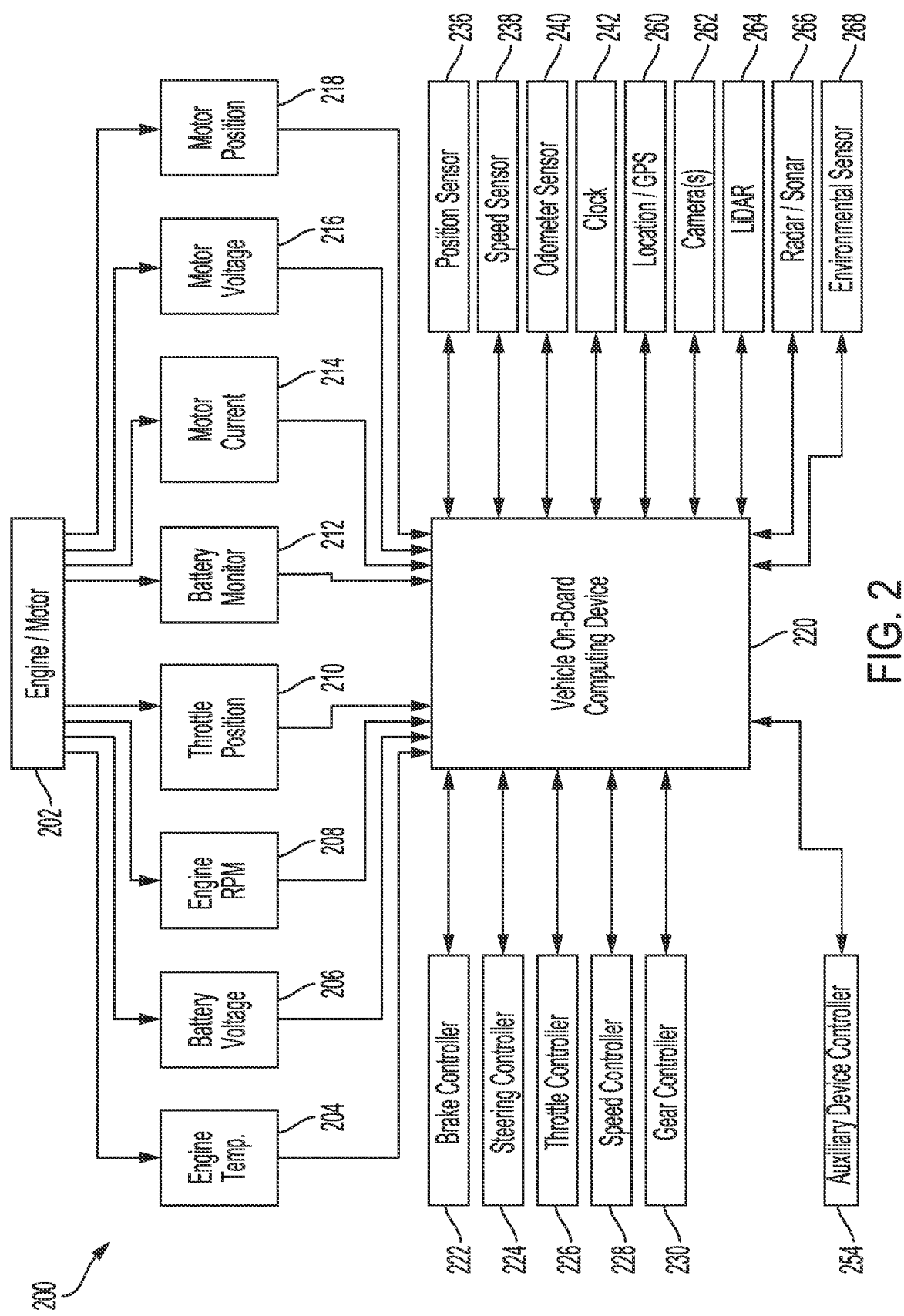
FIG. 2 is an illustration of an illustrative architecture for a vehicle.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals. Captured images from cameras 262 and/or object detection information captured from sensors such as LiDAR 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
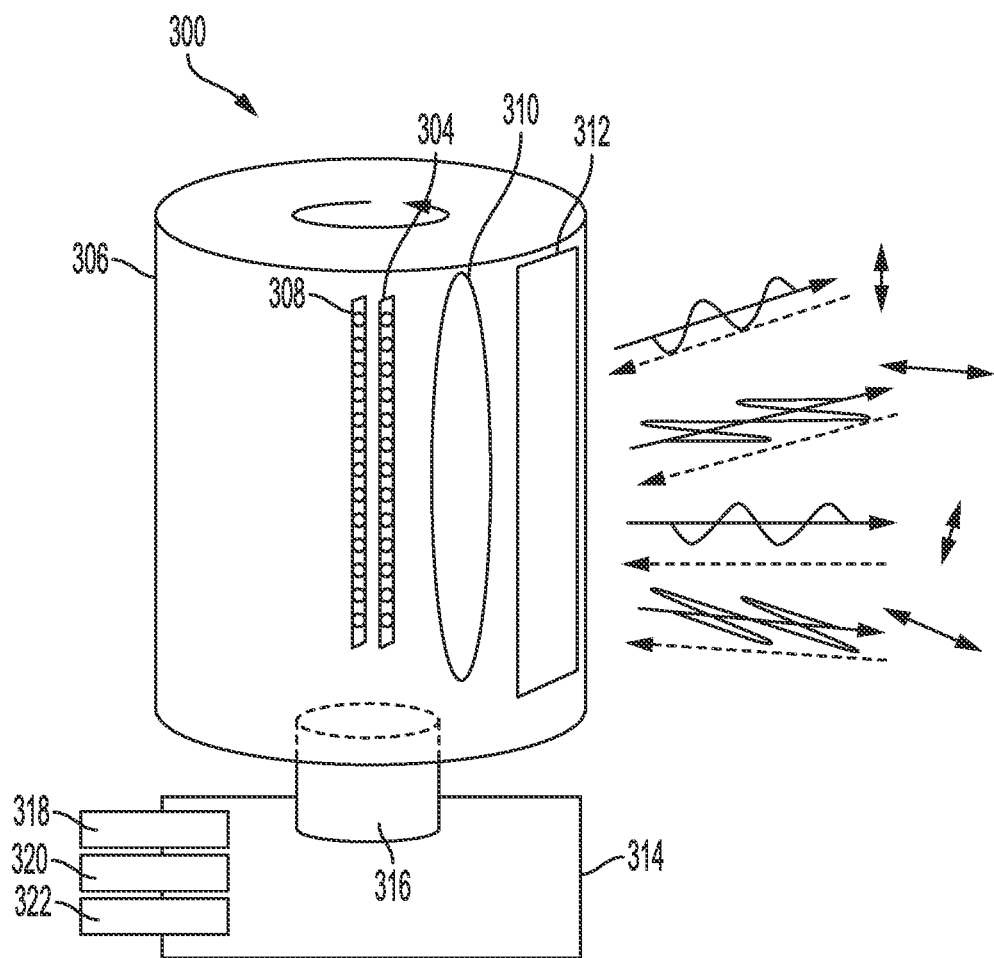
FIG. 3 is an illustration of an illustrative architecture for a LiDAR system.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 2, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
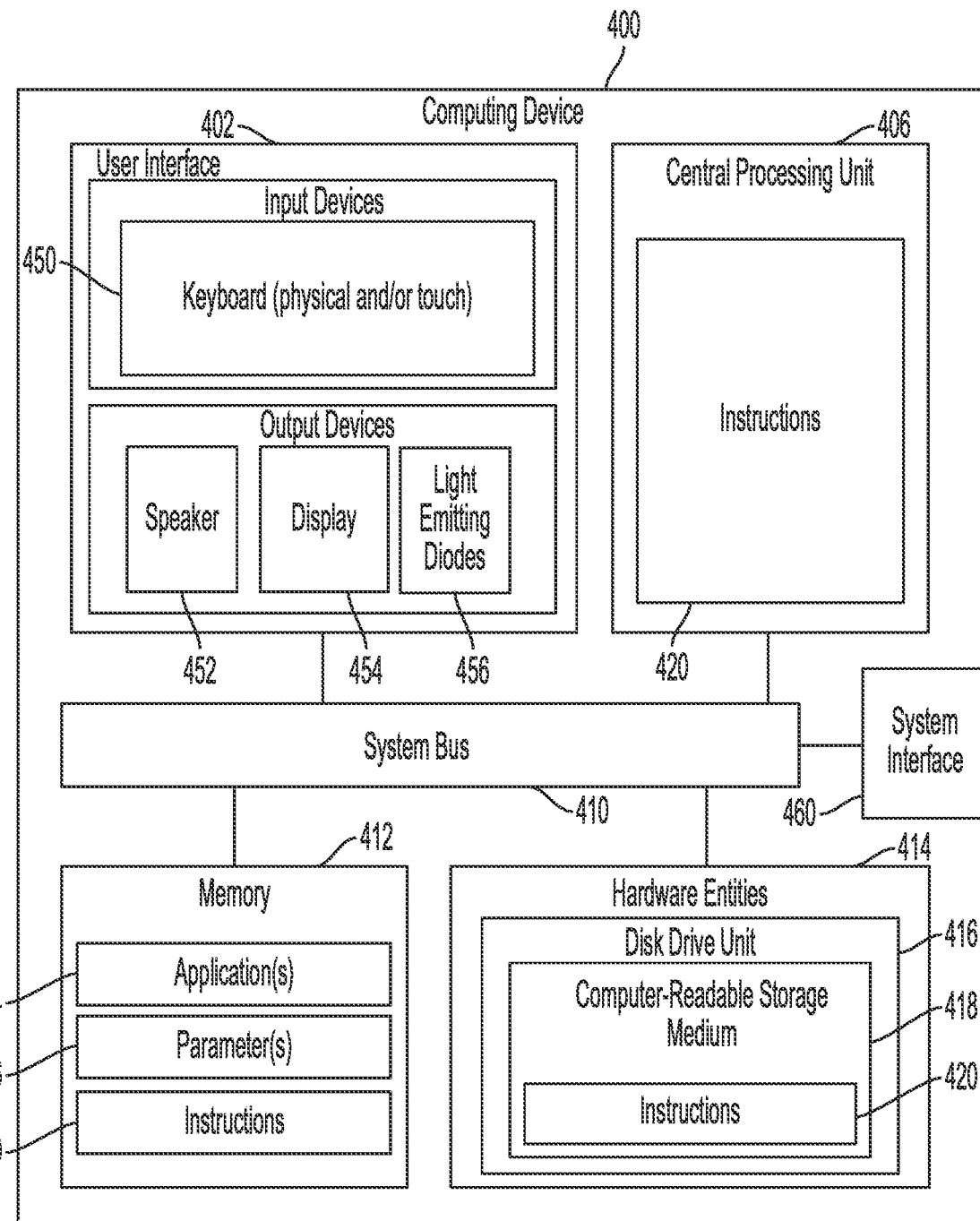
FIG. 4 is an illustration of an illustrative computing device.

Referring now to FIG. 4, FIG. 4 is an illustration of an illustrative architecture for a computing device 400. Computing device 400 can correspond to one or more devices of (e.g., one or more devices of a system of) autonomous vehicle 102 (e.g., one more devices of systems architecture 200, etc.) and/or one or more devices of map system 104. In some non-limiting embodiments or aspects, one or more devices of (e.g., one or more devices of a system of) autonomous vehicle 102 (e.g., one or more devices of system architecture 200, etc.) and/or one or more devices of map system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5:
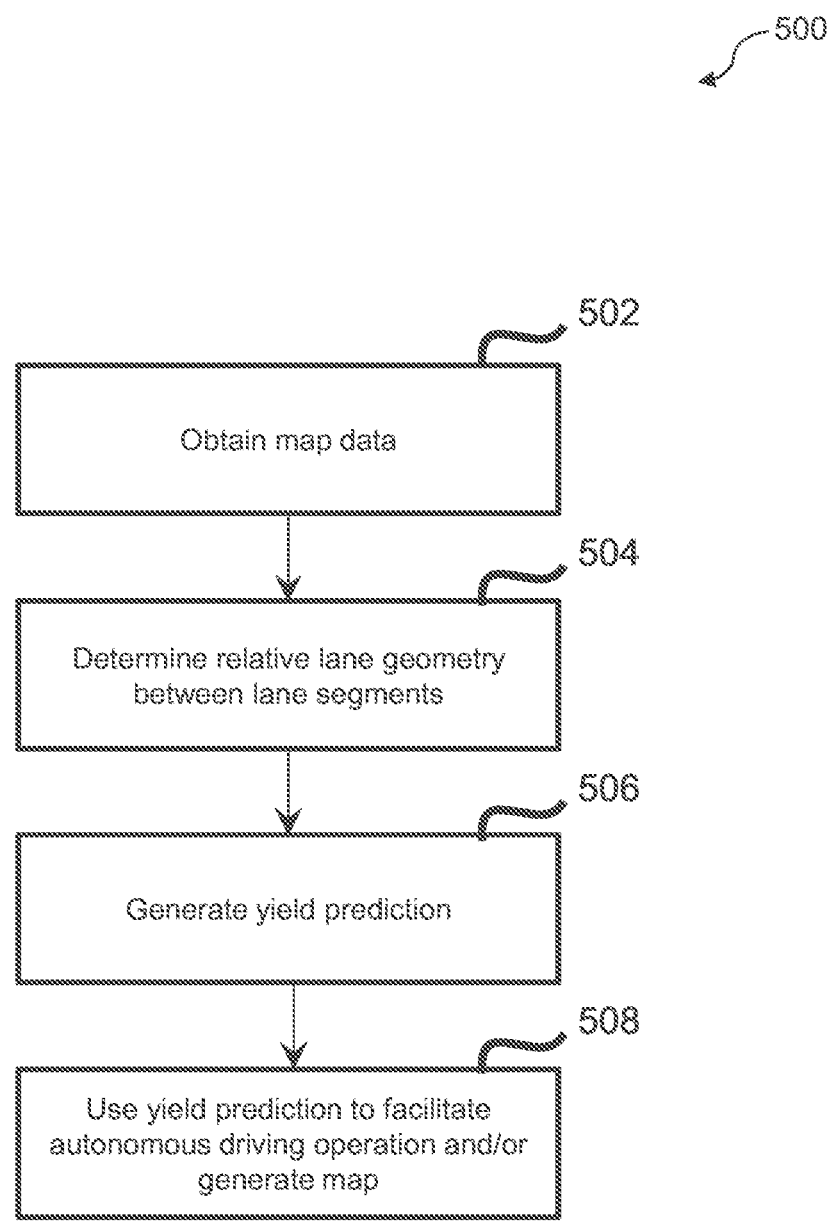
FIG. 5 is a flowchart of non-limiting embodiments or aspects of a process for lane conflict estimation.

Referring now to FIG. 5, FIG. 5 is a flowchart of non-limiting embodiments or aspects of a process 500 for automated lane conflict estimation. In some non-limiting embodiments or aspects, one or more of the steps of process 500 may be performed (e.g., completely, partially, etc.) by map system 104 (e.g., one or more devices of map system 104, etc.). In some non-limiting embodiments or aspects, one or more of the steps of process 500 may be performed (e.g., completely, partially, etc.) by another device or a group of devices separate from or including map system 104, such as autonomous vehicle 102 (e.g., system architecture 200, etc.).

As shown in FIG. 5, at step 502, process 500 includes obtaining map data. For example, map system 104 may obtain map data associated with a map of a geographic location including a roadway. As an example, the roadway may include a plurality of lane segments, the plurality of lane segments may include a pair of lane segments that overlap each other in the roadway, the pair of lane segments may be associated with a traffic signal or sign (e.g., a traffic light(s), a stop light(s), a stop sign(s), etc.), and/or the map data may be associated with a type of the traffic signal or sign (e.g., a traffic signal that includes one or more turning arrow bulbs, a traffic signal that includes one or more non-turning arrow bulbs, a configuration or arrangement of bulbs of a traffic signal, a stop sign, a yield sign, a no right turn on red sign, etc.).

In some non-limiting embodiments or aspects, a road refers to a paved or otherwise improved path between two places that allows for travel by a vehicle (e.g., autonomous vehicle 102, etc.). Additionally or alternatively, a road includes a roadway and a sidewalk in proximity to (e.g., adjacent, near, next to, touching, etc.) the roadway. In some non-limiting embodiments or aspects, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns), and/or the like. In some non-limiting embodiments or aspects, a roadway is connected to another roadway, for example a lane of a roadway is connected to another lane of the roadway and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway in a geographic location, attributes of a segment of a roadway, attributes of a lane of a roadway, attributes of a lane segment of a roadway, attributes of an edge of a roadway and/or lane, attributes of a driving path of a roadway and/or lane, etc.). For example, a roadway may include one or more lanes including one or more lane segments that form the one or more lanes. As an example, a starting position of a first lane segment may correspond to an ending position of a second lane segment succeeding the first lane segment in a lane in the roadway.

In some non-limiting embodiments or aspects, an attribute of a lane segment (and/or a lane, a roadway, a roadway segment, etc.) includes a lane edge of a lane segment (e.g., a location of a lane edge of a lane segment, a distance of a location from a lane edge of a lane segment, an indication whether a location is within a lane edge of a lane segment, etc.), an intersection, connection, overlap, or link of a lane segment with another lane segment, a distance of a lane segment from another lane segment (e.g., a distance of an end of a lane segment to an end of another lane segment, etc.), a curvature of a lane segment, a lane type of a lane segment (e.g., a travel lane of a roadway, a parking lane of a roadway, a turning lane of a roadway, etc.), a direction of travel in a lane segment, a centerline of a lane segment (e.g., an indication of a centerline path in at least one lane of the roadway for controlling autonomous vehicle 102 during operation (e.g., following, traveling, traversing, routing, etc.) on a driving path, a driving path of a lane segment (e.g., one or more trajectories that autonomous vehicle 102 can traverse in the roadway and an indication of the location of at least one feature in the roadway a lateral distance from the driving path, etc.), one or more objects (e.g., a vehicle, vegetation, a pedestrian, a structure, a building, a sign, a lamppost, signage, a traffic signal, a traffic sign, a bicycle, a railway track, a hazardous object, etc.) in proximity to and/or within a lane segment (e.g., objects in proximity to the road edges of a road and/or within the road edges of a road), a type of a traffic signal or sign (e.g., a bulb color, a turning arrow bulb, a non-turning arrow bulb, a stop sign, a yield sign, a no right turn on red sign, etc.), and/or the like.

As shown in FIG. 5, at step 504, process 500 includes determining a relative lane geometry between lane segments. For example, map system 104 may determine, based on the map data, a relative lane geometry between a first lane segment and a second lane segment of the pair of overlapping lane segments. As an example, a relative lane geometry may include at least one of the following: one or more angles between positions in the first lane segment and the second lane segment, one or more distances between positions in the first lane segment and the second lane segment, one or more areas within an overlap between the first lane segment and the second lane segment, one or more areas outside an overlap between the first lane segment and the second lane segment, or any combination thereof.

Figure 7B:
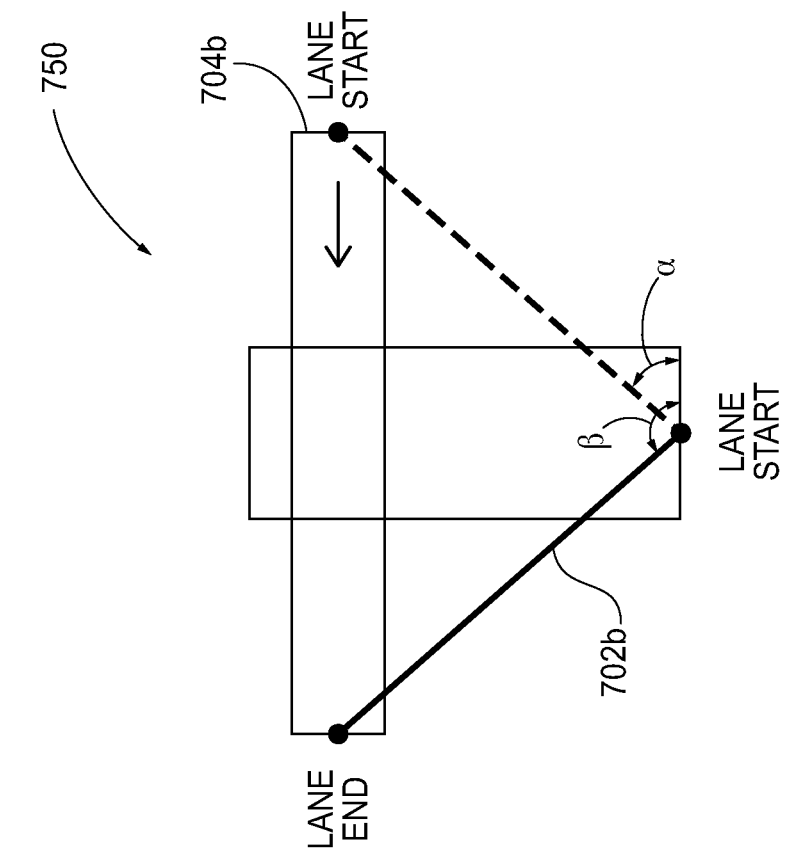
FIGS. 7A-B are diagrams illustrating examples of relative lane geometries between pairs of overlapping lanes.
Figure 7A:
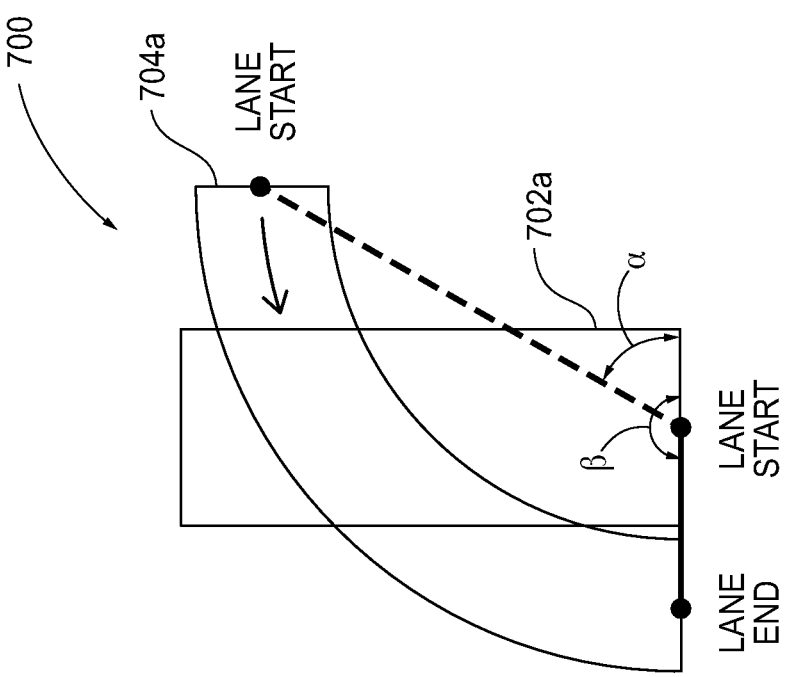

In some non-limiting embodiments or aspects, each of the first lane segment and the second lane segment may be associated with a start position and an end position in the map data, and determining the relative lane geometry between the first lane segment and the second lane segment may include: determining a first relative angle between the start position of the first lane segment and the start position of the second lane segment (e.g., between the start position of a centerline of the first lane segment and the start position of a centerline of the second lane segment, etc.); and determining a second relative angle between the start position of the first lane segment and the end position of the second lane segment (e.g., between the start position of the centerline of the first lane segment and the end position of the centerline of the second lane segment, etc.). For example, FIGS. 7A and 7B show examples 700 and 750 of a first relative angle α between a start position of a first lane segment 702a, 702b and a start position of a second lane segment 704a, 704b and a second relative angle β between the start position of the first lane segment 702a, 702b and an end position of the second lane segment 704a, 704b for two different example pairs of overlapping lanes. As shown in FIGS. 7A and 7B, the angles α and β may be defined with respect to a ray extending through and parallel to a start of the first lane (e.g., a candidate lane, etc.) and a respective ray extending from the start position of the first lane to the start position and end position of the second lane (e.g., a conflicting lane, etc.), respectively.

As shown in FIG. 5, at step 506, process 500 includes generating a yield prediction. For example, map system 104 may process, with a machine learning model, the relative lane geometry and the type of the traffic signal or sign to generate a prediction of whether the first lane segment yields to the second lane segment for a given state of the traffic signal or sign (e.g., a lit bulb or activated indicator of a color, type, or location, a sign being present, etc.). As an example, a state of a traffic signal or sign may be dynamic, such as one or more states of one or more bulbs (e.g., lit, unlit, flashing, etc.) of a traffic signal. As an example, a state of a traffic signal or sign may be static, such as a printed sign (e.g., stop sign, etc.).

In some non-limiting embodiments or aspects, map system 104 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including a classification for the pair of overlapping lane segments that indicates whether the first lane segment yields to the second lane segment for a given state of the traffic signal or sign (e.g., for a desired state of the traffic signal or sign, for a current state of the traffic signal or sign, for a future state of the traffic signal or sign, for all possible states of the traffic signal or sign, etc.) in response to input including map data (e.g., a type of a traffic signal or sign, etc.), a relative geometry between a pair of overlapping lanes, and/or a given state of the traffic signal or sign. In such an example, the prediction or classification of whether the first lane segment yields to the second lane segment may include one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other. In some non-limiting embodiments or aspects, classification may include a probability score associated with the class prediction for a pair of overlapping lanes for a given state of a traffic signal or sign. For example, the yield prediction may include a probability that the first lane segment yields to the second lane segment for a given state of the traffic signal or sign. As an example, the yield prediction may include at least one of the following: a probability that the first lane segment yields to the second lane segment and the second lane segment does not yield to the first lane segment, a probability that the first lane segment does not yield to the second lane segment and the second lane segment yields to the first lane segment, a probability that the first lane segment and the second lane segment yield to each other, or any combination thereof.

In some non-limiting embodiments or aspects, map system 104 may generate the model based on map data (e.g., training data, etc.) associated with one or more geographic locations. In some implementations, the model is designed to receive, as an input, map data (e.g., a type of a traffic signal or sign, etc.), a relative geometry between a pair of overlapping lanes, and/or a given state of the traffic signal or sign and provide, as an output, a prediction (e.g., a probability, a binary output, a yes-no output, a score, a prediction score, a classification, etc.) as to whether the first lane segment yields to the second lane segment for a given state of the traffic signal or sign. In some non-limiting embodiments, map system 104 stores the model (e.g., stores the model for later use). In some non-limiting embodiments or aspects, the model may be designed to automatically determine all possible states of the traffic signal or sign and to generate the prediction for each of possible states of the traffic signal or sign. In some non-limiting embodiments or aspects, the model may be designed to receive as input a desired or given state of the traffic signal or sign and to generate the prediction for the given state of the traffic signal or sign. In some non-limiting embodiments or aspects, map system 104 may store the model in a data structure (e.g., a database, a linked list, a tree, etc.). In some non-limiting embodiments, the data structure is located within map system 104 or external (e.g., remote from) map system 104 (e.g., within autonomous vehicle 102, etc.).

In some non-limiting embodiments or aspects, the machine learning model may further process (e.g., receive as input, etc.) at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

As shown in FIG. 5, at step 508, process 500 includes using a yield prediction to facilitate an autonomous driving operation and/or generate a map. For example, map system 104 may use the prediction to at least one of generate a map including the pair of overlapping lane segments associated with the prediction, facilitate at least one autonomous driving operation of an autonomous vehicle, or any combination thereof.

In some non-limiting embodiments or aspects, map system 104 may generate a new map and/or update an existing map based on the prediction or classification of whether the first lane segment yields to the second lane segment. For example, the map may include the pair of overlapping lane segments with a conflict mapping indicating a yield condition associated with the first lane and/or the second lane for one or more states of one or more traffic signals or signs associated with that overlapping pair of lanes. The map may be displayed on a GUI, such as a GUI populated on display 454 of autonomous vehicle 102. The map may include, among other features, notations and/or metadata for conflict mappings for pairs of overlapping lanes generated through process 500, such as a notation indicating that a first lane and/or lane segment yields to an overlapping second lane and/or lane segment or that a second lane and/or lane segment yields to an overlapping first lane and/or lane segment. For example, a yielding lane and/or lane segment may be represented on the map in a way that is visually distinct from a non-yielding lane and/or lane segment (e.g., representing a yielding lane/lane segment using a different color than a non-yielding lane/lane segment).

In some non-limiting embodiments or aspects, map system 104 may use the prediction or classification of whether the first lane segment yields to the second lane segment to prioritize a manual review of a map including automatically labeled conflict mapping. For example, if a machine-learning classifier outputs an uncertain probability associated with a yield prediction score for a lane pair (e.g., a yield prediction for a lane with respect to another lane includes a probability that fails to satisfy a threshold probability, such as that it fails to fall within a threshold distance of 0.1 or 1.0, etc.), there may be a greater amount of uncertainty in the classification and a higher likelihood that the classifier is incorrect, thereby making the machine classified yield constraint or conflict mapping for the lane a higher priority for manual review. As an example, map system 104 may use the probability scores associated with lane conflicts to rank the lane conflicts that humans review, and prioritize more complex cases for a human mapping team to review.

In some non-limiting embodiments or aspects, autonomous vehicle 102 (e.g., system architecture 200, etc.) may control at least one autonomous driving operation of autonomous vehicle 102 based on the prediction or classification of whether the first lane segment yields to the second lane segment. For example, autonomous vehicle 102 (e.g., system architecture 200, etc.) may determine whether to proceed on a route or yield to another vehicle based on the prediction or classification of whether the first lane segment yields to the second lane segment and/or based on a map including the prediction or classification. As an example, an autonomous vehicle 102 (e.g., system architecture 200, etc.) traveling on a route in the first lane may determine whether to proceed on the route or yield to another vehicle in the second lane based on the prediction or classification of whether the first lane segment yields to the second lane segment for a current state of the traffic signal or sign. In some non-limiting embodiments or aspects, if a machine-learning classifier executed by autonomous vehicle 102 (e.g., system architecture 200, etc.) outputs an uncertain probability associated with a yield prediction score for a lane pair (e.g., a yield prediction for a lane with respect to another lane includes a probability that fails to satisfy a threshold probability, such as that fails to fall within a threshold distance of 0.0 or 1.0, etc.) such that autonomous vehicle 102 (e.g., system architecture 200, etc.) is unsure whether or not the another lane yields to the lane, autonomous vehicle 102 (e.g., system architecture 200, etc.) may automatically determine to take a more conservative action by yielding to any actors (e.g., other vehicles, etc.) in the another lane or by making a call to remote guidance to request help and/or control of autonomous vehicle 102 by a human operator.

In some non-limiting embodiments or aspects, map system 104 may perform steps 504-508 for each pair of overlapping lane segments of a plurality of lane segments in one or more maps. In this way, conflict mapping for maps including extensive lists of lanes and lane pairs may be more efficient and less prone to errors, thereby enabling improved safety for autonomous vehicle operations.

Figure 6:
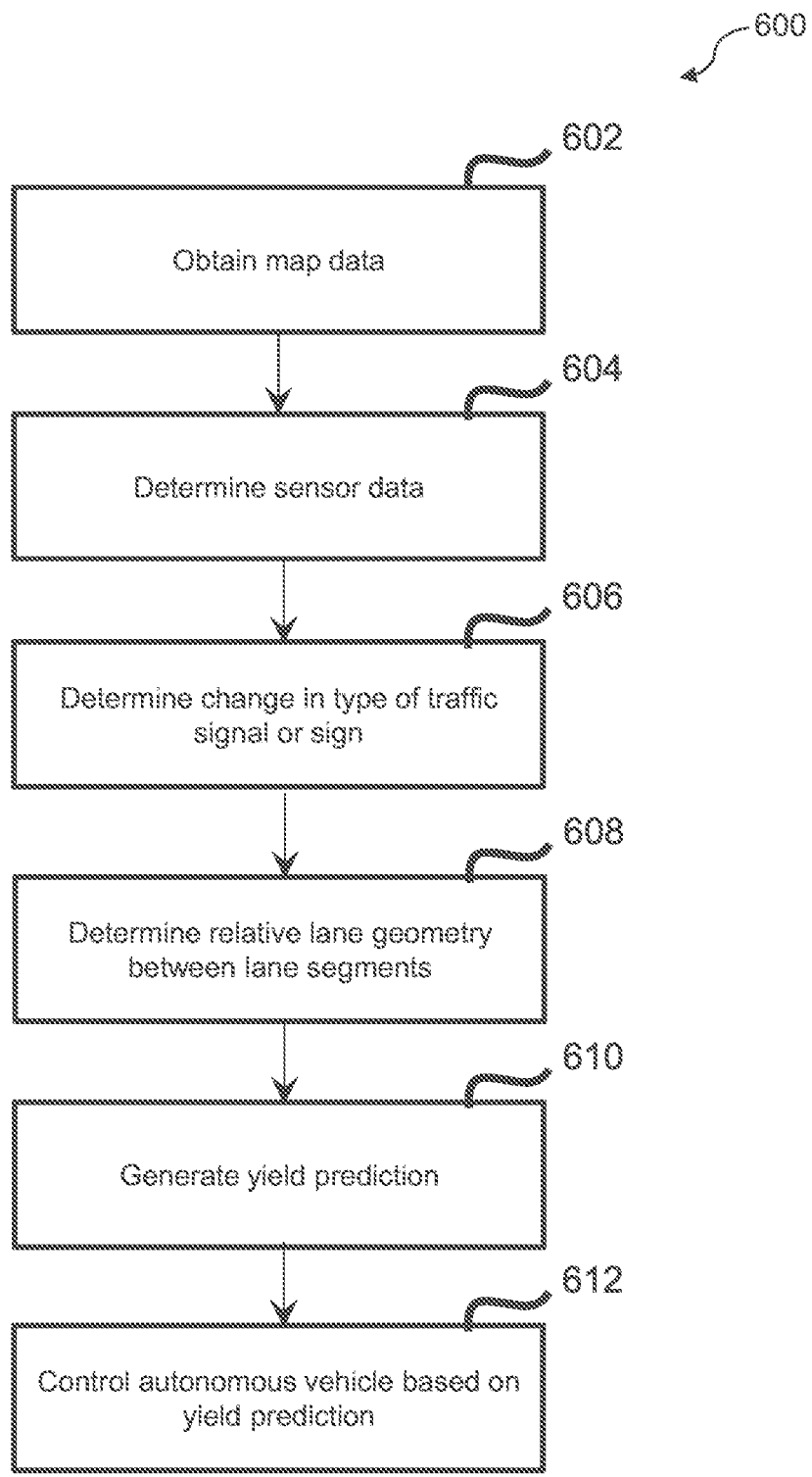
FIG. 6 is a flowchart of non-limiting embodiments or aspects of a process for lane conflict estimation.

Referring now to FIG. 6, FIG. 6 is a flowchart of non-limiting embodiments or aspects of a process 600 for automated lane conflict estimation. In some non-limiting embodiments or aspects, one or more of the steps of process 600 may be performed (e.g., completely, partially, etc.) by autonomous vehicle 102 (e.g., system architecture 200, etc.). In some non-limiting embodiments or aspects, one or more of the steps of process 600 may be performed (e.g., completely, partially, etc.) by another device or a group of devices separate from or including autonomous vehicle 102 (e.g., system architecture 200, etc.), such map system 104 (e.g., one or more devices of map system 104, etc.).

As shown in FIG. 6, at step 602, process 600 includes obtaining map data. For example, autonomous vehicle 102 (e.g., system architecture 200, etc.) may obtain map data associated with a map of a geographic location including a roadway. As an example, the roadway may include a plurality of lane segments, the plurality of lane segments may include a pair of lane segments that overlap each other in the roadway, the pair of lane segments may be associated with a traffic signal or sign, and/or the map data may be associated with a type of the traffic signal or sign. In some non-limiting embodiments or aspects, the map data may include a predetermined conflict mapping associated with the pair of overlapping lane segments.

As shown in FIG. 6, at step 604, process 600 includes determining sensor data. For example, autonomous vehicle 102 (e.g., LiDAR system 300, camera 262, etc.) may determine sensor data associated with an environment surrounding autonomous vehicle 102. As an example, sensor data may include data that describes a location and/or a state of objects within the surrounding environment of autonomous vehicle 102. In some non-limiting embodiments or aspects, sensor data may include a detected traffic signal or sign, a type of the detected traffic signal or sign, and/or a current state of the detected traffic signal or sign.

As shown in FIG. 6, at step 606, process 600 includes determining a change in a type of a traffic signal or sign For example, autonomous vehicle 102 (e.g., system architecture 200, etc.) may determine, based on the sensor data and the map data, a change in the type of the traffic signal or sign. As an example, autonomous vehicle 102 (e.g., system architecture 200, etc.) may compare sensor data associated with a current environment surrounding autonomous vehicle 102 to map data associated with a map of that environment to determine a change in the environment from that included in the map, such as a changed traffic signal or sign (e.g., a new traffic signal or sign that is not included in the map at that location, a missing traffic signal or sign that is included in the map at that location, a different traffic signal or sign than a traffic signal or sign included in the map at that location, etc.).

As shown in FIG. 6, at step 608, process 600 includes determining a relative lane geometry between lane segments. For example, autonomous vehicle 102 (e.g., system architecture 200, etc.) may determine, based on the map data, a relative lane geometry between a first lane segment and a second lane segment of the pair of overlapping lane segments. As an example, in response to determining a change in a traffic signal or sign, autonomous vehicle 102 (e.g., system architecture 200, etc.) may determine a relative lane geometry for a pair of lane segments associated with the changed traffic signal or sign.

Determination of a relative lane geometry in step 608 of FIG. 6 may be the same as or substantially similar to step 504 of FIG. 5 and, therefore, further discussion thereof is omitted in the interest of brevity.

As shown in FIG. 6, at step 610, process 600 includes generating a yield prediction. For example, autonomous vehicle 102 (e.g., system architecture 200, etc.) may process, with a machine learning model, the relative lane geometry and the type of the traffic signal or sign (e.g., the changed type of traffic signal or sign, etc.) to generate a prediction of whether the first lane segment yields to the second lane segment for a given state (e.g., a current state, a future state, etc.) of the traffic signal or sign.

Generation of a yield prediction in step 610 of FIG. 6 may be the same as or substantially similar to step 506 of FIG. 5 and, therefore, further discussion thereof is omitted in the interest of brevity.

As shown in FIG. 6, at step 612, process 600 includes controlling an autonomous vehicle based on a yield prediction. For example, autonomous vehicle 102 (e.g., system architecture 200, etc.) may control, based on the prediction, at least one autonomous driving operation of autonomous vehicle 102. As an example, an autonomous vehicle 102 (e.g., system architecture 200, etc.) traveling on a route in the first lane may determine whether to proceed on the route or yield to another vehicle in the second lane based on the prediction or classification of whether the first lane segment yields to the second lane segment for a current state of the traffic signal or sign. In this way, autonomous vehicle 102 can generate and use an updated and more accurate conflict mapping to avoid reliance on the outdated predetermined conflict mapping in the map data for controlling autonomous driving operation.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
obtaining map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign;

determining, based on the map data, a relative lane geometry between a first lane segment and a second lane segment of the pair of overlapping lane segments;

processing, with a machine learning model, the relative lane geometry and the type of the traffic signal or sign to generate a prediction of whether the first lane segment yields to the second lane segment for a given state of the traffic signal or sign; and using the prediction to control at least one autonomous driving operation of an autonomous vehicle, wherein each of the first lane segment and the second lane segment of the pair of overlapping lane segments is associated with a start position and an end position in the map data, and wherein determining the relative lane geometry between the first lane segment and the second lane segment of the pair of overlapping lane segments includes:

determining a first relative angle between the start position of the first lane segment and the start position of the second lane segment of the pair of overlapping lane segments; and determining a second relative angle between the start position of the first lane segment and the end position of the second lane segment of the pair of overlapping lane segments.

2. The computer-implemented method of claim 1, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

3. The computer-implemented method of claim 1, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

4. The computer-implemented method of claim 1, wherein the type of the traffic signal or sign includes at least one of the following: a turning arrow signal, a non-turning arrow signal, a stop sign, or any combination thereof.

5. The computer-implemented method of claim 1, wherein determining the first relative angle between the start position of the first lane segment and the start position of the second lane segment of the pair of overlapping lane segments includes determining the first relative angle between the start position of a centerline of the first lane segment and the start position of a centerline of the second lane segment, wherein determining the second relative angle between the start position of the first lane segment and the end position of the second lane segment includes determining the second relative angle between the start position of the centerline of the first lane segment and the end position of the centerline of the second lane segment, and wherein the first relative angle and the second relative angle are determined with respect to a ray extending through and parallel to the start position of the centerline of the first lane segment and a respective ray extending from the start position of the centerline of the first lane segment to the start position of the centerline and the end position of the centerline of the second lane, respectively.

6. A system comprising:
one or more processors programmed and/or configured to:
obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign;

determine, based on the map data, a relative lane geometry between a first lane segment and a second lane segment of the pair of overlapping lane segments;

process, with a machine learning model, the relative lane geometry and the type of the traffic signal or sign to generate a prediction of whether the first lane segment yields to the second lane segment for a given state of the traffic signal or sign; and use the prediction to control at least one autonomous driving operation of an autonomous vehicle, wherein each of the first lane segment and the second lane segment of the pair of overlapping lane segments is associated with a start position and an end position in the map data, and wherein the one or more processors are programmed and/or configured to determine the relative lane geometry between the first lane segment and the second lane of the pair of overlapping lane segments segment by:

determining a first relative angle between the start position of the first lane segment and the start position of the second lane segment; and determining a second relative angle between the start position of the first lane segment and the end position of the second lane segment.

7. The system of claim 6, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

8. The system of claim 6, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

9. The system of claim 6, wherein the type of the traffic signal or sign includes at least one of the following: a turning arrow signal, a non-turning arrow signal, a stop sign, or any combination thereof.

10. The system of claim 6, wherein the one or more processors are programmed and/or configured to:

determine the first relative angle between the start position of the first lane segment and the start position of the second lane segment of the pair of overlapping lane segments by determining the first relative angle between the start position of a centerline of the first lane segment and the start position of a centerline of the second lane segment; and determine the second relative angle between the start position of the first lane segment and the end position of the second lane segment by determining the second relative angle between the start position of the centerline of the first lane segment and the end position of the centerline of the second lane segment, wherein the first relative angle and the second relative angle are determined with respect to a ray extending through and parallel to the start position of the centerline of the first lane segment and a respective ray extending from the start position of the centerline of the first lane segment to the start position of the centerline and the end position of the centerline of the second lane, respectively.

11. An autonomous vehicle comprising:
one or more sensors configured to determine sensor data associated with an environment surrounding the autonomous vehicle;
a computing device programmed and/or configured to:
obtain map data associated with a map of a geographic location including a roadway, wherein the roadway includes a plurality of lane segments, wherein the plurality of lane segments include a pair of lane segments that overlap each other in the roadway, wherein the pair of overlapping lane segments is associated with a traffic signal or sign, and wherein the map data is associated with a type of the traffic signal or sign;
determine, based on the sensor data and the map data, a change in the type of the traffic signal or sign in the environment surrounding the autonomous vehicle from the type of traffic signal or sign included in the map data;
in response to determining the change in the type of the traffic signal or sign in the environment surrounding the autonomous vehicle from the type of traffic signal or sign included in the map data, determine, based on the map data, a relative lane geometry between a first lane segment and a second lane segment of the pair of overlapping lane segments;
process, with a machine learning model, the relative lane geometry and the changed type of the traffic signal or sign to generate a prediction of whether the first lane segment yields to the second lane segment for a given state of the traffic signal or sign; and
control, based on the prediction, at least one autonomous driving operation of the autonomous vehicle.

12. The autonomous vehicle of claim 11, wherein the prediction of whether the first lane segment yields to the second lane segment includes one of the following: a prediction that the first lane segment yields to the second lane segment and the second lane segment does not yield to the first lane segment, a prediction that the first lane segment does not yield to the second lane segment and the second lane segment yields to the first lane segment, and a prediction that the first lane segment and the second lane segment yield to each other.

13. The autonomous vehicle of claim 11, wherein each of the first lane segment and the second lane segment is associated with a start position and an end position in the map data, and wherein the computer device is programmed and/or configured to determine the relative lane geometry between the first lane segment and the second lane segment by:
determining a first relative angle between the start position of the first lane segment and the start position of the second lane segment; and
determining a second relative angle between the start position of the first lane segment and the end position of the second lane segment.

14. The autonomous vehicle of claim 13, wherein the computer device is programmed and/or configured to:
determine the first relative angle between the start position of the first lane segment and the start position of the second lane segment of the pair of overlapping lane segments by determining the first relative angle between the start position of a centerline of the first lane segment and the start position of a centerline of the second lane segment; and
determine the second relative angle between the start position of the first lane segment and the end position of the second lane segment by determining the second relative angle between the start position of the centerline of the first lane segment and the end position of the centerline of the second lane segment,
wherein the first relative angle and the second relative angle are determined with respect to a ray extending through and parallel to the start position of the centerline of the first lane segment and a respective ray extending from the start position of the centerline of the first lane segment to the start position of the centerline and the end position of the centerline of the second lane, respectively.

15. The autonomous vehicle of claim 11, wherein the machine learning model further processes at least one of the following attributes to generate the prediction of whether the first lane segment yields to the second lane segment: a lane type of the first lane segment, a lane type of the second lane segment, a curvature of the first lane segment, a curvature of the second lane segment, a percentage of overlap between the first lane segment and the second lane segment, or any combination thereof.

16. The autonomous vehicle of claim 11, wherein the type of the traffic signal or sign includes at least one of the following: a turning arrow signal, a non-turning arrow signal, a stop sign, or any combination thereof.

17. The autonomous vehicle of claim 11, wherein the computing device is programmed and/or configured to control the at least one autonomous driving operation of the autonomous vehicle by controlling the vehicle to one of proceed on a route in the first lane segment and yield to another vehicle in the second lane segment.

18. The autonomous vehicle of claim 11, wherein the change in the type of the traffic signal or sign includes one of the following: a new traffic signal or sign in the environment surrounding the autonomous vehicle that is not included in the map at a same location, a missing traffic signal or sign in the environment surrounding the autonomous vehicle that is included in the map at the same location, a different traffic signal or sign in the environment surrounding the autonomous vehicle than the traffic signal or sign included in the map at the same location.

* * * * *